Patented Mar. 18, 1952

2,589,326

UNITED STATES PATENT OFFICE 2,589,326

ORGANIC PHOSPHORUS ESTER-P₂S₅ REACTION PRODUCTS AND OIL COMPOSITIONS CONTAINING THE SAME

Edward A. Oberright, Woodbury, N. J., assignor to Socony-Vacuum Oil Company, Incorporated, a corporation of New York No Drawing. Application December 21, 1949, Serial No. 134,356

15 Claims. (Cl. 252—46.6)

1

This invention relates to improved lubricating compositions. More particularly, the invention is concerned with mineral lubricating oil compositions containing reaction products formed by the reaction of an organic phosphorus acid ester containing at least one alkenyl group with phosphorus pentasulfide, as oxidation and corrosion inhibitors.

As is well known, mineral lubricating oils tend to decompose, especially under heat and oxidizing conditions, such as those encountered in use in internal combustion engines. The decomposition products formed in the oil are acidic in nature and exert a corrosive action upon the metal surfaces being lubricated. The present invention is concerned with a novel class of chemical compounds which are highly effective in counteracting the tendency of lubricating oil to oxidize and thus corrode the metal surfaces. I have discovered that the reaction products of phosphorus pentasulfide and organic esters of phosphorus acids containing an alkenyl group are excellent addition agents for stabilizing mineral lubricating oils against the deleterious effects of oxidation. It is, therefore, the primary object of this invention to provide lubricating oil compositions containing these new antioxidant compounds. Other objects will also become apparent as the description of the invention proceeds.

As far as is known, the P₂S₅-phosphorus acid ester reaction products contemplated herein have not been known heretofore and are, therefore, contemplated herein as new compositions of matter.

The phosphorus acid ester utilized for reaction with phosphorus pentasulfide in accordance with the invention may be either a phosphate, a thiophosphate or a phosphite ester. The esters of the invention may be broadly defined by means of the general formula:

I  $(RX)_3P(X)_n$ wherein, R represents a radical selected from the group consisting of alkyl, aryl, alkaryl and alkenyl radicals, at least one R radical being an alkenyl radical; X represents an oxygen or a sulfur atom; and $n$ represents zero or 1. By "alkenyl" radical is meant an aliphatic monovalent radical having an olefinic bond therein.

Although any phosphorus acid ester containing three R groups of the aforedefined character will be effective as an antioxidant in mineral lubricating oils, those having a total aliphatic content of at least about nine carbon atoms in the R groups thereof are preferred, since they are

2 most readily soluble in the oil. Particularly preferred, however, are the esters in which all three R groups are alkenyl groups, since greater amounts of phosphorus and sulfur can be incorporated into esters of this type. Such a preferred ester is trioleyl phosphite.

The alkenyl phosphorus esters of the invention fall into the following groups:

(a) Alkenyl phosphate esters, represented by the general formula:

II 

wherein R is defined as in general Formula I above. Typical examples of this type of ester are dibutyl vinyl phosphate, dioctyl allyl phosphate, diamyl octenyl phosphate, dilauryl octadecenyl phosphate, octyl phenyl octadecenyl phosphate and diwax octadecenyl phosphate;

(b) Alkenyl thiophosphate esters. These esters are represented by the general Formula I above, however, in these esters at least one X is a sulfur atom. Typical examples of such esters are dipropyl allyl trithiophosphate, dioctyl allyl dithiophosphate, dilauryl octadecenyl tetrathiophosphate, diamyl octadecenyl monothiophosphate and diwax octadecenyl tetrathiophosphate;

(c) Alkenyl phosphite esters. These esters are represented by the general formula:

III 

wherein R is again as defined in general Formula I. Typical examples of this type of ester are dimethyl vinyl phosphite, diethyl allyl phosphite, dipropyl allyl phosphite, dibutyl ethenyl phosphite, dipentyl vinyl phosphite, diamyl octenyl phosphite, diamyl isooctenyl phosphite, octyl phenyl allyl phosphite, dicyclohexyl octenyl phosphite, dilauryl dodecenyl phosphite, dibutylphenyl octadecenyl phosphite, diamyl octadecenyl phosphite, dioctadecyl octadecenyl phosphite, diwax phenyl octadecenyl phosphite, diwax octadecenyl phosphite and diphenyl octadecenyl phosphite.

The reaction of the organic phosphorus ester with the phosphorus pentasulfide may be carried out by heating the reactants at a temperature of from about 100° C. to about 200° C. and preferably from 150° C. to 160° C. for a period of from about 1 to about 5 hours, preferably from 2 to 3 hours, the longer heating times requiring the lower temperatures and the shorter heating times requiring the higher temperatures within these ranges. However, the temperature in any case should not be carried above about 200° C. since higher temperatures effect decomposition of the products.

With respect to the amount of reactants, ⅛ mol of $P_2S_5$ for each double bond in the phosphorus ester is the largest amount that may be reacted to introduce both phosphorus and sulfur into the ester. However, an excess of $P_2S_5$ over ⅛ mol per double bond in the ester will introduce more sulfur into the product compound. The exact nature of the reaction is not known, however, the preferred reaction products are those produced by reacting about ⅛ mol to 1 mol of $P_2S_5$ with 1 mol of the alkenyl phosphorus ester.

For the purpose of this invention, the reaction between the phosphorus ester and the $P_2S_5$ may be conveniently conducted in a mineral oil solvent medium, the product thus obtained being a blend of the additive product in mineral oil.

Details as to the procedure used in preparing the products of the invention and the type of results to be obtained by the use of these products in mineral lubricating oils may be understood from the following specific examples and test results.

*Preparation of trioleyl phosphite*

803 gms. oleyl alcohol (3 mols)
69 gms. sodium (3 mols)
137 gms. phosphorus trichloride (1 mol)
1000 cc. toluene The oleyl alcohol used was the commercial product made by Du Pont and sold under the trade name of "Ocenol."

The oleyl alcohol was dissolved in toluene and the solution was heated to 110° C. The metallic sodium was slowly added in small pieces. The reaction is slow and required six hours. After standing several days at room temperature, the phosphorus trichloride was added slowly at 50° C., followed by heating at 100° C. for one hour. The reaction product was filtered through Hy-flo clay (a filter aid) to remove the sodium chloride that was formed during the reaction. The toluene and unreacted oleyl alcohol were removed by distillation to 300° C. under 3 mm. pressure. A yield of 43 per cent was obtained. The product analyzed 3.7% P.; theoretical is 4.17%. This material was used to make the products described in Examples I and II.

Any known method for the preparation of an alkenyl phosphite ester, other than the foregoing, may be used.

EXAMPLE I.—Trioleyl phosphite+$P_2S_5$ (⅜ mol)

52 gms. trioleyl phosphite
5.2 gms. $P_2S_5$
57 gms. SAE 30 grade motor oil

The ratio of the reactants was ⅜ mol of phosphorus pentasulfide to 1 mol of trioleyl phosphite, or ⅛ mol of phosphorus pentasulfide per double bond in a trioleyl phosphite.

The trioleyl phosphite was blended in the mineral oil and phosphorus pentasulfide added at room temperature. The temperature was slowly raised to 150° C. while stirring the reaction and held at 150°–160° C. for 2½ hours. The hot reaction mixture was filtered through paper. The final product was a 1/2 oil blend which analyzed as follows:

|  | For 1/2 Oil Blend | |
|---|---|---|
|  | Analytical | Theoretical |
|  | Percent | Percent |
| Per cent phosphorus | 3.29 | 3.09 |
| Per cent sulfur | 3.57 | 3.28 |

Theoretical per cent phosphorus is based on the analytical data (3.7% P) obtained for trioleyl phosphite plus the phosphorus introduced by adding phosphorus pentasulfide.

EXAMPLE II.—Trioleyl phosphite+$P_2S_5$ (1 mol)

52 gms. trioleyl phosphite
13.8 gms. $P_2S_5$
66 gms. SAE 30 grade motor oil

In this reaction, 1 mol of phosphorus pentasulfide was reacted with 1 mol of trioleyl phosphite. The phosphorus pentasulfide was added to the trioleyl phosphite in mineral oil at room temperature. The temperature was slowly raised and held at 150–160° C. for 2¾ hours. At this point, the reaction mixture was slightly hazy and was filtered hot through "Hy-flo" clay (filter aid) to remove the haze, which probably was unreacted phosphorus pentasulfide. The final product was approximately a 1/2 oil blend and analyzed as follows:

|  | For 1/2 Oil Blend | |
|---|---|---|
|  | Analytical | Theoretical |
|  | Percent | Percent |
| Per cent phosphorus | 3.62 | 4.52 |
| Per cent sulfur | 7.9 | 7.53 |

The theoretical figures are based on the assumption that all of the phosphorus pentasulfide had reacted and was present in the final products. If the sulfur in the oil used in making this additive is included, the theoretical sulfur content becomes 7.78%.

A comparison of the analyses of Examples I and II shows that any phosphorus pentasulfide in excess of ⅛ mol per double bond results in introducing more sulfur in the product, without an appreciable increase in phosphorus.

*Corrosion inhibition*

The products of the foregoing examples have been tested in mineral oils suitable for lubricating internal combustion engines. The percentage of additive used in making the oil blends refers to the actual material as described above, i. e., the additive in a 1/2 oil blend.

(a) LAUSON OXIDATION STABILITY TEST

This test determines oil deterioration as measured by increase in neutralization number. The procedure is as follows: The test is carried out in a single cylinder, liquid cooled Lauson engine operated continuously over a time interval of 36 hours. During the test the cooling medium is held at a temperature of about 212° F. and the oil temperature at 250°–260° F. The engine speed is maintained at about 1815 R. P. M. At the end of the test run, the oil is tested for acidity in terms of its neutralization number (N. N.). The results of such tests conducted on blends of our products in a solvent-refined oil of 45 Saybolt seconds viscosity at 210° F. (Olean 10) were as follows:

|  | Results at 36 Hours— | |
|---|---|---|
|  | S. U. S. @ 210°F. | N. N. |
| Olean 10—no additive | 63.61 | 13.6 |
| Olean 10+½% Example I | 48.72 | 4.0 |
| Olean 10—no additive | 54.04 | 9.1 |
| Olean 10+½% Example II | 45.44 | 0.8 |

(b) BUBBLE TEST

This test determines the relative tendency of oils to corrode metal bearings. The test is conducted as follows: A section of a bearing having a cadmium-silver alloy surface and weighing about 6.0 grams is placed in a solvent-refined Pennsylvania oil having an S. U. V. of 53 seconds at 210° F. The oil is heated at 175° C. for 22 hours while a stream of air is blown through the oil at the rate of 2 liters per hour. The bearing section is then removed, cleaned and reweighted. The loss in weight, in mgms., of the bearings is indicative of the corrosiveness of the oil. The results obtained in such tests on oils containing typical products of this invention were as follows:

| Additive | Conc. | Mg. Wt. Loss Cd-Ag Bearing | |
|---|---|---|---|
|  |  | Inhibited Oil | Base Oil |
|  | Percent |  |  |
| Example I | ½ | 0 | 18 |
| Example I | ¼ | 0 | 18 |
| Example II | ½ | 0 | 18 |
| Example II | ¼ | 0 | 18 |

The remarkable inhibiting effect of the additives of the invention is brought out in the above tests. They very effectively prevent the oxidation of the mineral oils, as shown by the low viscosity and neutralization numbers obtained under actual test conditions. The bubble test indicates that they are very effective in preventing bearing corrosion.

The amount of organic phosphorus ester-P₂S₅ product added to the mineral oil will vary somewhat with the intended application of the oil composition, and generally will be from about 1/10% to about 10%. However, significant antioxidant improvement is obtained with as little as .01%. It is further contemplated that the product compounds be incorporated in the oil in greater amounts, i. e. above 10%, to provide oil "concentrates" for marketing. These concentrated compositions have the advantage of affording a readily soluble form of the additive materials for dilution with additional amounts of oil prior to actual use.

The oils in which our new addition agents are used, or the oil "concentrates," may also contain other additives, designed to improve the character of the oil in other respects, such as detergency, V. I., pour point, etc.

Although the principles of this invention have been illustrated herein by means of certain specific examples and tests, it is not intended that the scope of the invention be limited thereby, but only as indicated in the following claims.

I claim:

1. As a new composition of matter, the phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical at a temperature of from about 100° C. to about 200° C.

2. As a new composition of matter, the phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical, the combined R groups having a total of at least nine aliphatic carbon atoms, at a temperature of from about 100° C. to about 200° C.

3. As a new composition of matter, the phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkenyl, aryl, alkaryl and alkenyl radicals, at least one R being an alkenyl radical, the combined R group having a total of at least nine aliphatic carbon atoms, at a temperature of from about 100° C. to about 200° C. for a time period between about 1 and about 5 hours.

4. As a new composition of matter, the phosphorus- and sulfur-containing product obtained by reacting about ⅜ mol of phosphorus pentasulfide with 1 mol of trioleyl phosphite at a temperature of from about 100° C. to about 200° C. and for a time period of from about 1 to about 5 hours.

5. As a new composition of matter, the phosphorus- and sulfur-containing product obtained by reacting about 1 mol of phosphorus pentasulfide with 1 mol of trioleyl phosphite at a temperature of from about 100° C. to about 200° C. and for a time period of from about 1 to about 5 hours.

6. As a new composition of matter, the phosphorus- and sulfur-containing product obtained by reacting about ⅜ mol of phosphorus pentasulfide with 1 mol of trioleyl phosphite at a temperature of from about 150° C. to about 160° C. and for a time period of from about 2 to about 3 hours.

7. As a new composition of matter, the phosphorus- and sulfur-containing product obtained by reacting 1 mol of phosphorus pentasulfide with 1 mol of trioleyl phosphite at a temperature of from about 150° C. to about 160° C. and for a time period of from about 2 to about 3 hours.

8. A mineral lubricating oil containing a small amount, sufficient to stabilize said oil against oxidation, of a phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical, at a temperature of from about 100° C. to about 200° C.

9. A mineral lubricating oil containing a small amount, from about .01% to about 10%, of a phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical, at a temperature of from about 100° C. to about 200° C.

10. A mineral lubricating oil containing a small amount, sufficient to stabilize such oil against oxidation, of a phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical, the combined R groups having a total of at least nine aliphatic carbon atoms, at a temperature of from about 100° C. to about 200° C.

11. A mineral lubricating oil containing a small amount, sufficient to stabilize said oil against oxidation, of a phosphorus- and sulfur-containing product obtained by reacting from about ⅛ mol to about 1 mol of phosphorus pentasulfide with 1 mol of an alkenyl phosphite ester of the general formula

wherein R is a radical selected from the group consisting of alkyl, aryl, alkaryl and alkenyl radicals, at least one R being an alkenyl radical, the combined R groups having a total of at least nine aliphatic carbon atoms, at a temperature of from about 100° C. to about 200° C. for a time period between about 1 to about 5 hours.

12. A mineral lubricating oil containing a small amount, sufficient to stabilize said oil against oxidation, of a phosphorus- and sulfur-containing product obtained by reacting about ⅜ mol of phosphorus pentasulfide with 1 mol of trioleyl phosphite at a temperature of from about 100° C. to about 200° C. and for a time period of from about 1 to about 5 hours.

13. A mineral lubricating oil containing a small amount, sufficient to stabilize said oil against oxidation, of a phosphorus- and sulfur-containing product obtained about 1 mol of phosphorus pentasulfide with 1 mol of trioleyl phosphite at a temperature of from about 100° C. to about 200° C. and for a time period of from about 1 to about 5 hours.

14. A mineral lubricating oil containing a small amount, sufficient to stabilize said oil against oxidation, of a phosphorus- and sulfur-containing product obtained by reacting about ⅜ mol of phosphorus pentasulfide with 1 mol of trioleyl phosphite at a temperature of from about 150° C. to about 160° C. and for a time period of from about 2 to about 3 hours.

15. A mineral lubricating oil containing a small amount, sufficient to stabilize said oil against oxidation, of a phosphorus- and sulfur-containing product obtained by reacting about 1 mol of phosphorus pentasulfide with 1 mol of trioleyl phosphite at a temperature of from about 150° C. to about 160° C. and for a time period of from about 2 to about 3 hours.

EDWARD A. OBERRIGHT.

REFERENCES CITED

The following references are of record in the file of this patent:

UNITED STATES PATENTS

| Number | Name | Date |
|---|---|---|
| 2,252,479 | Beyer | Aug. 12, 1941 |
| 2,271,409 | Thurman | Jan. 27, 1942 |
| 2,459,090 | Otto | Jan. 11, 1949 |
| 2,506,344 | Cleary | May 2, 1950 |